Jan. 28, 1964 W. E. PERKINS 3,119,263
RATE OF FLOW INDICATOR FOR MORTAR
Filed Aug. 30, 1961
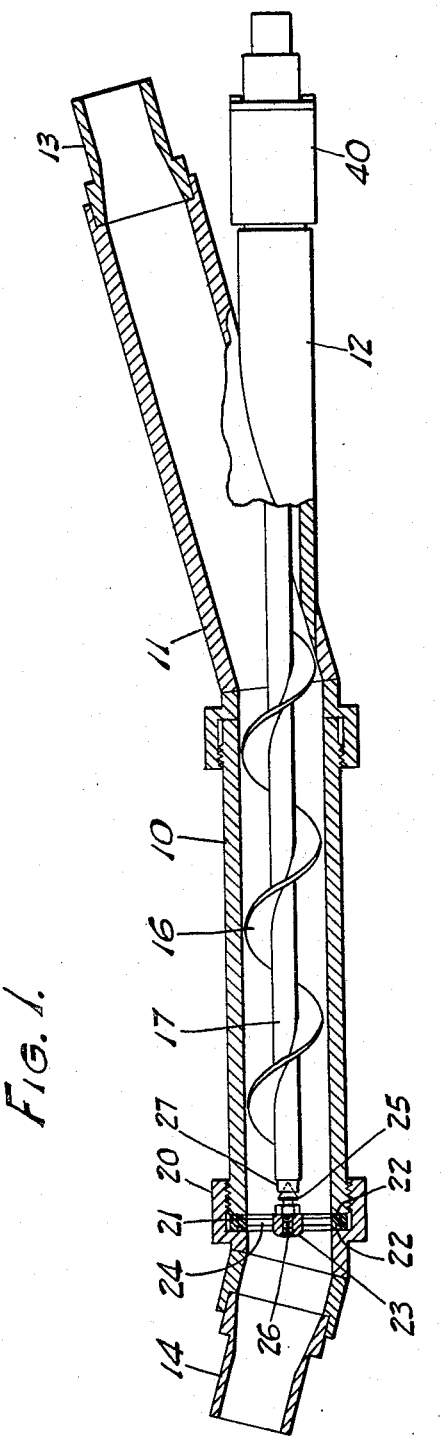
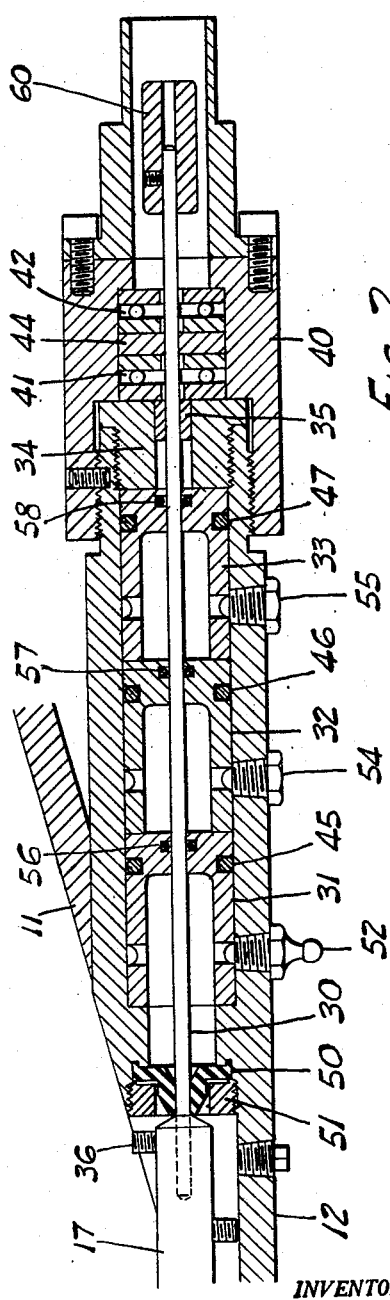
INVENTOR.
WARREN E. PERKINS
BY
Christel & Bean
ATTORNEYS.

3,119,263
RATE OF FLOW INDICATOR FOR MORTAR
Warren E. Perkins, Grand Island, N.Y., assignor to Perkins Pipe Linings, Inc., Grand Island, N.Y.
Filed Aug. 30, 1961, Ser. No. 135,071
2 Claims. (Cl. 73—231)

This invention relates to apparatus for measuring the rate of flow of semi-fluid or plastic material through a conduit and more particularly to apparatus especially adapted to measuring the rate of flow of mortar being delivered through a pipe line.

While the apparatus of the present invention is susceptible of various uses, it is especially adapted to and aimed at the metering or flow-recording of mortar being delivered to subterranean pipe lining machinery. In a pipe lining machine the machine travels through the interior of a pipe at a variable or controllable speed and the thickness of the layer of mortar which it deposits on the interior of the pipe is dependent in large part on the relationship between the speed of travel of the machine and the rate of flow of mortar to the machine.

Accurate measurement of the rate of flow of mortar to the lining machine therefore becomes an important objective in or in conjunction with such machinery. The resultant measurement or indication can merely be observed and employed by an operator in making adjustments of the operations of other portions of the apparatus or automatic control relationships may be established as in United States Letters Patent No. 2,988,042, granted June 13, 1961, to the present applicant and Alfred J. Perkins.

The heavy, viscous nature of wet mortar renders metering or flow-measuring thereof very difficult and the highly abrasive character of the material further complicates the problem of providing a satisfactory metering instrument, both from the standpoint of accuracy of measurement and minimizing of wear and tear on the mechanism.

The present invention provides a mortar metering apparatus which is relatively accurate, considering the special nature of the material being measured and the unusual problems presented thereby. Furthermore, the overall life of the apparatus and relative freedom from undue wear contribute to the unusual utility and usefulness thereof. Special means are provided for avoiding access of the highly abrasive mortar to the supporting bearings of the apparatus.

Effective provisions for minimizing leakage and consequent access of the abrasive mortar slurry to the bearing surfaces is complicated by the very high internal pressures which are developed in the particular instance of use described above. The mortar passes through the meter or flow measuring apparatus under pressures of the general magnitude of five hundred pounds per square inch.

Various other objects and advantages of the apparatus of the present invention will appear to those skilled in the art from a consideration of the following specification and the accompanying drawing wherein an exemplary embodiment of the principles of the invention is described and illustrated. However, it is to be understood that such embodiments are by way of example only and that the principles of the invention may be variously applied and embodied and the scope of the invention is not limited otherwise than as defined in the appended claims.

In the drawing:

FIG. 1 is a general longitudinal cross-sectional view of one form of the mortar meter of the present invention; and FIG. 2 is a longitudinal cross-sectional view on a substantially enlarged scale of a bearing portion of the mortar meter of FIG. 1.

Like characters of reference denote like parts and, referring particularly to FIG. 1, the numerals 10 and 11 designate a pair of pipe sections which are rigidly connected in end to end relation to form a flow chamber which comprises the general body structure of the apparatus. The sections 10 and 11 extend at a slight angle with respect to each other and section 11 includes a bearing sleeve 12 which may be welded or otherwise rigidly joined therewith and which is so disposed that it forms a coaxial extension of body section 10.

The right-hand end of body section 11, as viewed in FIG. 1, is provided with a fitting 13 for connection with a mortar supply conduit and the left-hand end of body section 10 is provided with a fitting 14 for connection with an outlet conduit which, in the instance illustrated herein by way of example, may lead to a subterranean pipe lining machine. Thus the mortar flows through the body sections from right to left as viewed in the drawing and in the course of such flow acts against a blade formation 16 which extends helically about a supporting shaft 17 with which it may be integrally formed.

The provision of freely rotatable support means for screw shaft 17 and the provision of a construction wherein the leakage problem in connection with the shaft mounting is adequately dealt with comprise important aspects of the invention. It is of course essential that the rotation of shaft 17 within the mortar chamber formed by the pipe sections 10 and 11 be transmitted outwardly from the mortar chamber and the construction of the present invention accomplishes this purpose in a novel and highly effective manner.

The heavy viscous nature of the wet mortar dictates a meter or flow measuring structure which imposes an absolute minimum of resistance to flow thereof and it will be noted that the present arrangement is such that the mortar flows through the meter virtually in a straight line, excepting for the slight angle formed by axes of the body sections 10 and 11.

Shaft 17 is rotatably supported at one end directly within the mortar conduit portion of the flow measuring apparatus and at its other end externally thereof, as will presently appear. At the outlet end of pipe section 10 an internally threaded cap 20 carries outlet fitting 14 and an annular rim portion 21 of a bearing support member is clamped between the adjacent end of pipe section 10 and an internal ledge of cap 20 as clearly shown in FIG. 1. O-rings 22 seal the joint between pipe section 10 and cap 20 at either side of the rim member 21.

A bearing supporting hub 23 is supported by rim member 21 by means of radiating spokes 24 which impose a minimum of obstruction or resistance to mortar flow and a conical bearing member 25 of Carboloy or similar material is fixed to the end of a screw 26 which supports bearing member 25 for axial adjustment. The left-hand end of shaft 17 is provided with a Carboloy end member 27 having a conical recess for bearing engagement with conical bearing member 25.

The foregoing bearing construction is particularly suitable to the conditions of operation prevailing in the present mortar flow measuring apparatus. The extreme long-wearing characteristics of Carboloy and similar carbide alloys are well known and the conical bearing construction provides a bearing having a relatively low surface speed and one which is readily adjustable in an axial direction to compensate for wear.

The opposite end of shaft 17 is rotatably supported indirectly by way of a relatively small diameter shaft or rod 30 which minimizes bearing speeds and accordingly minimizes friction and at the same time provides a construction wherein the potential leakage areas around the rotating parts are held to an absolute minimum.

Bearing sleeve 12 of body section 11 is counterbored to receive a series of three cup-shaped members 31, 32 and 33 which are clamped within the counterbore of bearing sleeve 30 in end to end relation by a screw member 34. The latter includes a bronze bushing 35 which gives bearing support to the relatively small diameter shaft or rod 30 and thus also to the right-hand end of screw shaft 17. The left-hand end of rod 30 fits into an axial opening in the adjacent end of screw shaft 17 and may be held therein by a set screw 36.

An internally threaded cap member 40 engages over the outer end of bearing sleeve 12 and is counterbored to receive a pair of thrust ball bearing assemblies 41 and 42. A collar 44 is fixed to rod 30 and is disposed between the thrust bearing assemblies 41 and 42, whereby end thrust of screw shaft 17 is transmitted to the bearing sleeve structure including cap member 40.

Reference will now be had to the cup-shaped members 31, 32 and 33 and the sealing means provided at the left-hand end of bearing sleeve 12 as viewed in FIG. 2, which elements thoroughly isolate the anti-friction bearing members 41, 42 from any reasonably possible contact with the highly abrasive and highly pressured material flowing through the body sections 10 and 11.

Each of the cup-shaped members 31, 32 and 33 has a radial end wall portion which fits fairly closely about shaft or rod 30 and is sealed with respect thereto by an O-ring as at 56, 57 and 53, respectively. Thus the cup-shaped members 31, 32 and 33 provide a series of relatively sealed chambers spaced along shaft 30 within bearing sleeve 12 with the left-hand chamber terminating adjacent to the connection between screw shaft 17 and the small diameter shaft 30. In addition, each of the cup-shaped members 31, 32 and 33 is provided with an external O-ring, as at 46, 47 and 48, respectively, to isolate each cup-shaped member in the counterbore in bearing sleeve 12.

At such end of bearing sleeve 12 a flexible seal 50 is held in place by a threaded retaining ring 51. Seal 50 has a tapered opening disposed about shaft 30 and the arrangement is such that fluid pressure from the left, that is from the mortar containing portion of the apparatus, tends to urge the skirt portion of the seal more firmly against the periphery of shaft 30, whereas pressure from the space immediately to the right of the seal tends to stretch the tapered opening in a radial direction to permit fluid passage from right to left. Thus the flexible seal member 50 provides a sort of one way check valve.

Despite the precautions provided herein a certain amount of the abrasive wet material in the body member 11 will seep past the seal 50 due to the extreme high pressure within the mortar chamber and the rotation of shaft 30. The chamber within cup-shaped member 31 is filled with a water resistant type of grease and from time to time a pressure gun is applied to alemite fitting 52 to replenish the chamber within cup-shaped member 31 and preferably actually force some of the grease which is adjacent to the seal 50 at the right-hand side thereof through such seal to the mortar chamber, carrying with it such abrasive material as may have seeped through from the mortar chamber.

The chambers within the cup-shaped members 32 and 33 are likewise filled with water resistant lubricant but since these chambers do not require as frequent replenishment they may be closed with pipe plugs 54 and 55 which may be removed and replaced by grease fittings as required.

The extreme right-hand end of shaft 30 is provided with a ferrule or bushing 60 which is adapted to receive in its right-hand end a flexible tachometer shaft of the usual kind whereby the rate of rotation of screw 16, 17 may readily be directly translated to other control means adapted to control the speed of travel of a pipe lining machine or other functions dependent upon the rate of mortar delivery through the present flow measuring apparatus.

I claim:

1. In a flow measuring device for mortar and like material, an elongated body member comprising a pair of conduit portions in end to end relationship to form a mortar flow chamber, said conduit portions being disposed with their axes at an obtuse angle, one of said portions including an adjacent cylindrical bearing formation coaxial with the other of said portions, a rotatable screw member disposed coaxially in said other portion for variable rotation by and in proportion to flow of mortar therethrough, flexible seal means between said flow chamber and the interior of said bearing formation, a take-off shaft having anti-friction bearing mounting in said bearing formation and adapted to extend through said seal means for end-to-end connection with said screw, said seal means being adapted to flex to shaft engaging relationship under pressure from said flow chamber and being adapted to flex slightly away from the take-off shaft under pressure from said bearing formation, a lubricant chamber in said bearing formation adjacent to said seal means, and means for applying lubricant under pressure to said chamber whereby a portion of said lubricant passes said seal means toward the flow chamber to clear the lubricant chamber and seal means of leakage material from said flow chamber.

2. In a flow measuring device for mortar and like material, an elongated body member comprising a pair of conduit portions in end to end relationship to form a mortar flow chamber, said conduit portions being disposed with their axes at an obtuse angle, one of said portions including an adjacent cylindrical bearing formation coaxial with the other of said portions, a rotatable screw member disposed coaxially in said other portion for variable rotation by and in proportion to flow of mortar therethrough, flexible seal means between said flow chamber and the interior of said bearing formation, a take-off shaft having anti-friction bearing mounting in said bearing formation and adapted to extend through said seal means for end-to-end connection with said screw member, bearing means at the interior of said other conduit portion for rotatably supporting the opposite end of said screw member, said seal means being adapted to flex to shaft engaging relationship under pressure from said flow chamber and being adapted to flex slightly away from the take-off shaft under pressure from said bearing formation, a lubricant chamber in said bearing formation adjacent to said seal means, and means for applying lubricant under pressure to said chamber whereby a portion of said lubricant passes said seal means toward the flow chamber to clear the lubricant chamber and seal means of leakage material from said flow chamber.

References Cited in the file of this patent

UNITED STATES PATENTS

| | | |
|---|---|---|
| 138,657 | Johnson | May 6, 1873 |
| 1,425,936 | Bailey | Aug. 15, 1922 |
| 1,533,469 | Schmidt | Apr. 14, 1925 |